UNITED STATES PATENT OFFICE.

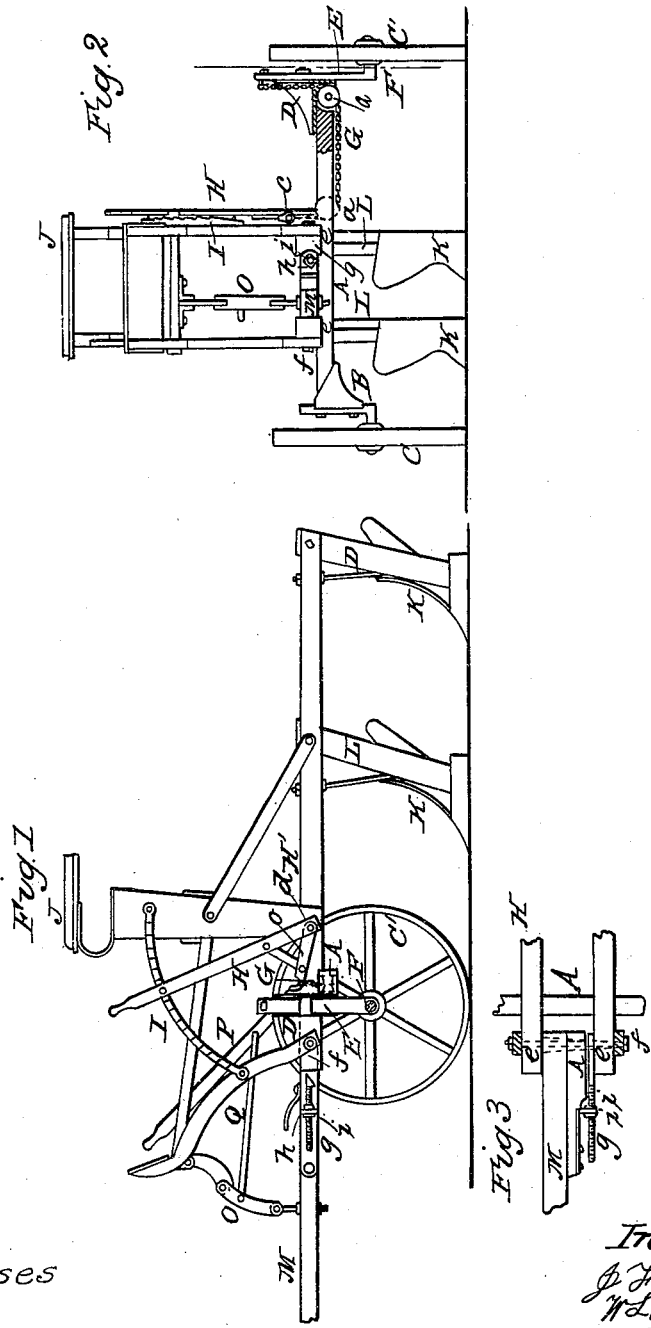

J. F. BLACK AND W. L. BLACK, OF LANCASTER, ILLINOIS.

IMPROVEMENT IN GANG-PLOWS.

Specification forming part of Letters Patent No. 51,543, dated December 19, 1865.

*To all whom it may concern:*

Be it known that we, J. F. BLACK and W. L. BLACK, of Lancaster, in the county of Cass and State of Illinois, have invented a new and Improved Gang-Plow; and we do hereby declare that the following is a full, clear, and exact description thereof, which will enable others skilled in the art to make and use the same, reference being had to the accompanying drawings, forming part of this specification, in which—

Figure 1 is a side view of our invention; Fig. 2, a front view of the same; Fig. 3, a detached plan or top view of the draft-pole attachment.

Similar letters of reference indicate like parts.

A represents an axle, one end of which has an arm, B, secured permanently to it with a wheel, C, fitted upon it. The other end of the axle has a socket, D, secured to it, in which a bar, E, is fitted loosely, the lower end of said bar having an arm, F, at its lower end, on which a wheel, C', is fitted.

The upper end of the bar E has a chain, G, attached to it, said chain passing down and around a pulley, $a$, in the axle, and then extending along underneath the axle and upward around a pulley, $a'$, to an arm, $c$, which is attached to a lever, H, the fulcrum-pin $d$ of the latter passing into the side of the main frame H' of the machine and engaging with a segment-rack, I, attached to one side of the machine. By adjusting this lever H the frame of the machine may be raised and lowered, and consequently the plows and the latter regulated to work over uneven ground and penetrate the earth at a uniform depth, the plows being under the complete control of the driver on his seat J.

The plows K are attached to the lower ends of standards L, which are secured to the frame H, one plow being in advance of the other.

M represents the draft-pole, the inner end of which is secured between the sides $e\ e$ of the frame H by a bolt, $f$, which passes through a taper-hole in the tongue, as shown by the dotted lines in Fig. 3. N is a plate which is fitted on the bolt $f$, and has a screw, $g$, at its front part, said screw passing through a plate, $h$, attached to the draft-pole and having a nut, $i$, upon it.

By turning the nuts $i$ the position of the draft-pole and the machine may be changed relatively with each other so as to give the plows more or less land and plow a furrow of greater or less width, as may be required.

The plows may be raised entirely out of the ground when not required for use, as, for instance, in drawing the machine from place to place or in turning at the ends of a field, by means of a toggle, O, attached to the draft-pole and a frame of the machine and operated by a lever, P, connected to the toggle by a rod, Q.

The device is extremely simple and efficient, and may be constructed at a moderate cost.

Having thus described our invention, we claim as new and desire to secure by Letters Patent—

1. The connecting of one of the wheels C' to its axle A by means of the bar E, fitted in a socket, D, and connected by a chain, G, to a lever, H, in the manner substantially as described, to admit of the vertical adjustment of the plows, for the purpose specified.

2. The adjusting of the draft-pole M laterally through the medium of the screw $g$, plate $h$, and nut $i$, substantially as and for the purpose set forth.

The above specification of our invention signed by us this 22d day of June, 1865.

J. F. BLACK.
W. L. BLACK.

Witnesses:
ALEX. NAYLOR,
JOSEPHUS NAYLOR.